United States Patent [19]

Ziese

[11] 4,025,894
[45] May 24, 1977

[54] METHOD AND APPARATUS FOR IMPROVING THE DIRECTIONAL CHARACTERISTIC OF AN ECHO SOUNDER RECEIVING BASE

[75] Inventor: Rolf Ziese, Worphausen, Germany

[73] Assignee: Fried. Krupp Gesellschaft mit beschrankter Haftung, Essen, Germany

[22] Filed: Mar. 9, 1976

[21] Appl. No.: 665,165

[30] Foreign Application Priority Data

Apr. 12, 1975    Germany .......................... 2516001

[52] U.S. Cl. .............................. 340/3 R; 340/6 R; 343/100 LE
[51] Int. Cl.$^2$ ..................... G01S 7/66; G01S 3/86; H04R 1/40
[58] Field of Search .......................... 340/6 R, 3 R; 343/100 LE

[56] References Cited

UNITED STATES PATENTS

| | | | |
|---|---|---|---|
| 3,170,135 | 2/1965 | Yagelowich | 340/6 R |
| 3,889,227 | 6/1975 | Takamizawa et al. | 343/100 LE |

*Primary Examiner*—Richard A. Farley
*Attorney, Agent, or Firm*—Spencer & Kaye

[57] ABSTRACT

A method and apparatus for improving the directional characteristic of an echo sounder receiving base, which includes a plurality of transducers arranged in a common plane, by means of multiplicative processing of output signals obtained from the signals received by the transducers from a submarine or underwater sound wave generator having a constant transmitting frequency. A plurality of output signals of different frequencies are derived from every signal received by each transducer with the same frequency as the transmitting frequency, with one output signal being of the transmitting frequency and with other output signals being of a higher and of a lower frequency than the transmitting frequency respectively. The output signals from all transducers of the same frequency are added together to form first, second and third group signals of the transmitting frequency, the higher frequency and the lower frequency respectively. The multiplicative processing includes a preliminary processing wherein the first group signal is multiplied with each of the second and third group signals and a second processing wherein the products of the preliminary processing are multiplied to provide the desired directional characteristic.

7 Claims, 7 Drawing Figures a — output signal of 5 to 8 at frequency f b — output signal of 11 to 14 at frequency f/2 c — output signal of 33 d — output signal of 34 e — output signal of 15 to 18 at frequency 2f

METHOD AND APPARATUS FOR IMPROVING THE DIRECTIONAL CHARACTERISTIC OF AN ECHO SOUNDER RECEIVING BASE

BACKGROUND OF THE INVENTION

The present invention relates to a method for improving the directional characteristic of an echo sounder receiving base including a plurality of transducers arranged in a plane by means of multiplicative processing of output signals obtained from the signals received by the transducers from a submarine or underwater sound wave generator with a constant transmitting frequency and to apparatus for practicing the method.

In the echo sounding art, it is customary to utilize echo sounder receiving bases which comprise only a small number of transducers and thus do not take up much space. This arrangement, however, produces an unfavorable curve for the directional characteristic which has a broad main lobe and large side lobes. A broad main lobe, however, prevents an accurate determination of the direction of impinging echo signals whereas large side lobes may greatly falsify the determination of the direction.

German Offenlegungsschrift (Laid Open Patent Application) No. 2,347,732, published Apr. 4, 1974, which corresponds to U.S. Pat. No. 3,889,227 discloses a method of obtaining an improvement in the directional characteristic of an echo sounder receiving base by multiplicative processing of the signals received by the transducers.

This method, however, operates with a specially designed echo sounder receiving base, including pairs of transducers which must be arranged at given distances from one another. Such a receiving base is not suited to produce an improvement of the directional characteristic of a planar echo sounder receiving base including any desired number and arrangement of transducers.

SUMMARY OF THE INVENTION

It is thus the object of the present invention to provide a method for improving the directional characteristic of a planar echo sounder receiving base having a plurality of transucers for receiving signals transmitted by an underwater sound generator of constant transmitting frequency, which method does not set any special requirements as to the number of transducers and their arrangement, and a circuit arrangement for practicing the method.

This is accomplished, according to the present invention, in that a plurality of output signals of different frequency are derived from every signal received by each transducer whose frequency is the transmitting frequency, with a first output signal being of the transmitting frequency, and with second and third output signals being higher and lower than the transmitting frequency respectively; the output signals associated with all of the transducers which are of the same frequency are added together to form first, second and thrid group signals respectively; the first and second group signals are multiplied together to form a first product signal; the first and third group signals are multiplied together to form a second product signal; and the first and second product signals are multiplied together to form a third product signal which constitutes the desired improved directional characteristic.

Since only frequency information is required, and not the amplitude information of the received signals, according to a further advantageous feature of the present invention, the received signals of the transducers are converted to rectangular pulse sequences of the same frequency and constant amplitude. This produces, on the one hand, independence of variations in sensitivity of the transducers, and on the other hand, it is easier to realize a derivation of output signals which are themselves rectangular signals from rectangular pulse sequences, than it is to derive output signals from sinusoidal received signals.

The group signals, in dependence on their frequency, indicate different directional characteristics.

If the received signals from all transducers are added, this group signal constitutes the echo signal from the echo sounder receiving base and provides a directional characteristic which is given by the design of the echo sounder receiving base. A group signal with a lower frequency indicates a directional characteristic with a broader main lobe, while a group signal with a higher frequency indicates a directional characteristic with a narrower main lobe. Multiplication of group signals thus corresponds to multiplication of different directional characteristics.

A definition of the directional characteristics formed from the group signals with respect to the directional characteristic of the echo sounder receiving base is possible only if output signals of the same frequency are derived from the received signals of all transducers, i.e., if only the frequency of the group signal is a measure for its directional characteristic.

A circuit arrangement for practicing the method according to the present invention is particularly easy to realize, according to a further advantageous feature of the invention, if the output signals which are derived have a frequency which differs from that of the transmitting frequency by the factor 2.

The signal generators are then simple flip circuits, i.e., bistable flip circuits with a dynamic input, in order to derive output signals from the output signals from the transducers at a frequency which is one-half of the transmitting frequency. To derive output signals whose frequency is twice the transmitting frequency, flip circuits are employed which include two monostable multivibrator stages which are connected in parallel but with one multivibrator having an inverter connected ahead of it and with the outputs of both multivibrators being connected to a NAND gate whose output is the output of the flip circuit.

Output signals with the same frequency are added to form group signals and series-connected bandpass filters filter out the undersirable frequency components resulting from the addition of the rectangular pulses. The received signals from the transucers are added to form a group signal with the transmitting frequency which constitutes the echo signal from the echo sounder receiving base.

Two group signals are fed to a multiplier and the multiplication of the echo signal with a group signal at one-half the transmitting frequency results in a directional characteristic for the echo sounder receiving base with attenuated side lobes. Multiplication of the echo signal with a group signal at twice the transmitting frequency results in a directional characteristic with increased directional sharpness of the main lobe but with high side lobes.

Multiplication of the two above-mentioned products results in a directional characteristic with high directional sharpness of the main lobe and very high attenuation of the side lobes as it is desirable for an echo sounder receiving base where it can be used with advantage.

The present invention makes it possible to provide a method and apparatus for practicing the method to improve the directional characteristic of an echo sounder receiving base, which method does not require any special configuration of the echo sounder receiving base and thus can also be used additionally with already available and operational planar echo sounder receiving bases.

DETAILED DESCRIPTION OF THE PREFERRED EMBODIMENTS

Figure 1:
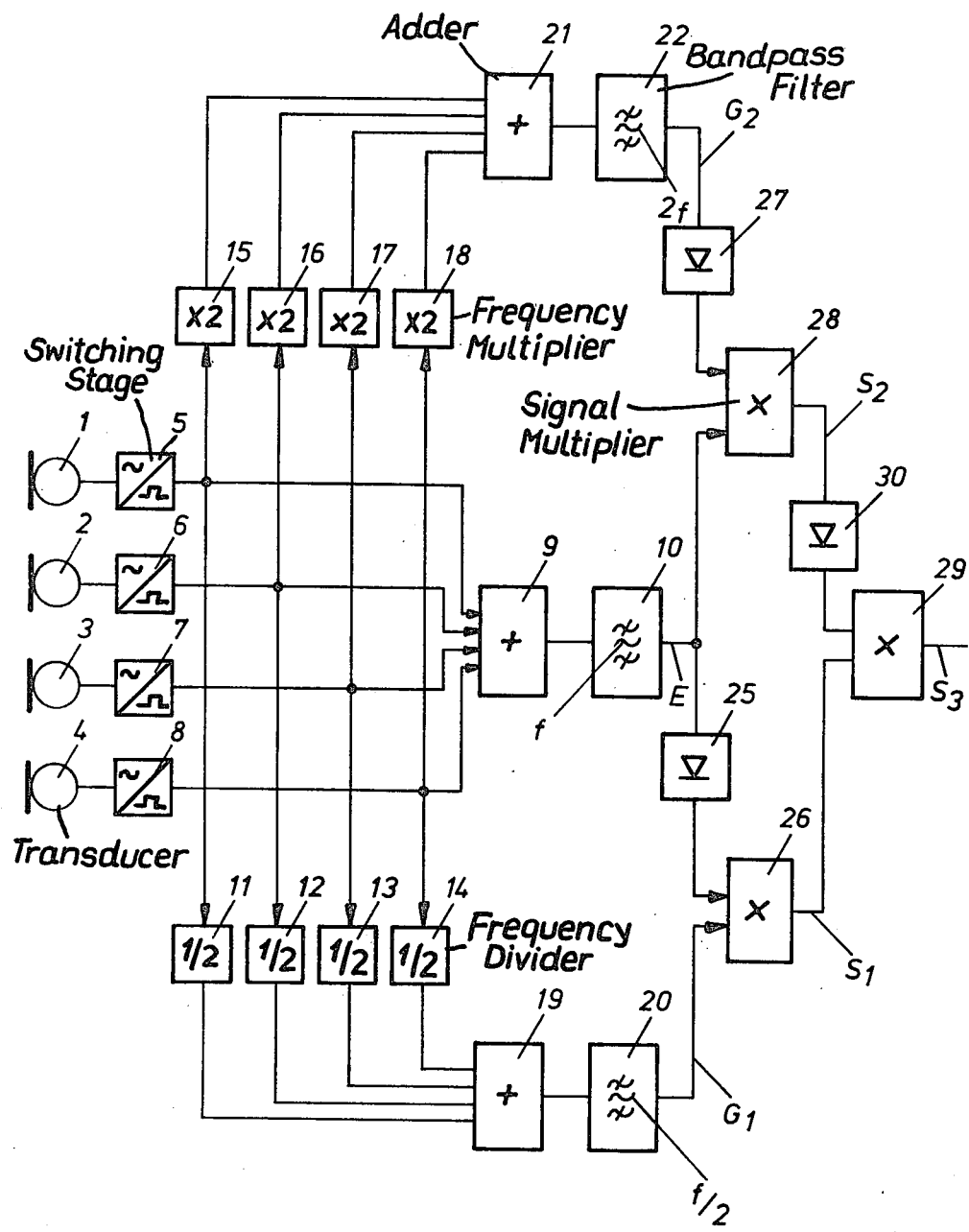
FIG. 1 is a block circuit diagram of a circuit arrangement according to the invention for deriving output signals of the same frequency from the received signals from all transducers.

As shown in FIG. 1, the echo sounder receiving base includes four transducers 1 through 4 arranged in a common plane. Transducers 1 through 4 are connected in series with switching stages 5 through 8 respectively having infinitely low switching thresholds to convert the received signals from transducers 1 through 4 to rectangular pulses at the same frequency and with constant amplitude.

Figure 2:
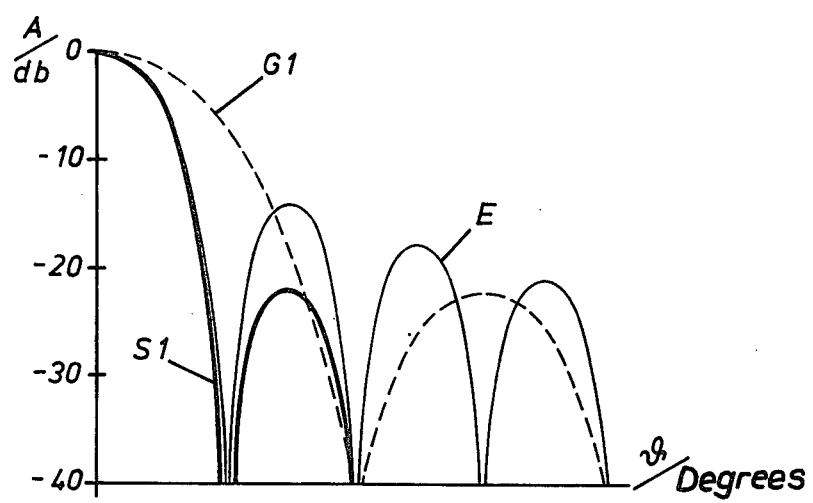
FIG. 2 shows the directional characteristics of an echo signal, a group signal with a frequency which is one-half the frequency of the echo signal, as well as the product resulting from the multiplication of both of these signals.

The outputs of switching stages 5 through 8 are connected to an adder 9 which is connected in series with a bandpass filter 10 whose center frequency $fm$ is equal to the transmitting frequency $f$ of a submarine or underwater sound wave generator (not shown). The output signal of bandpass filter 10 is the echo or group signal E and indicates the directional characteristic of the echo sounder receiving base as it is shown in FIG. 2 in a graph of the amplitude in dependence on the angle of the incidence $\delta$ with respect to the normal to the plane of the echo sounder receiving base. This echo signal E has a relatively broad main lobe and a first side lobe which is attenuated only by approximately 10 dB.

Figure 5:
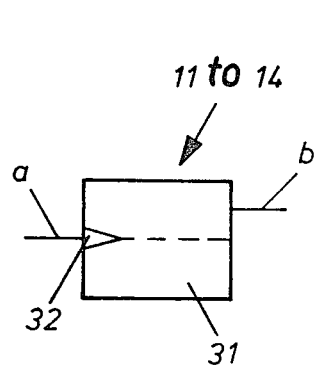
FIG. 5 shows a flip circuit for forming output signals with the frequency $f/2$ according to the block circuit diagram of FIG. 1.
Figure 7:
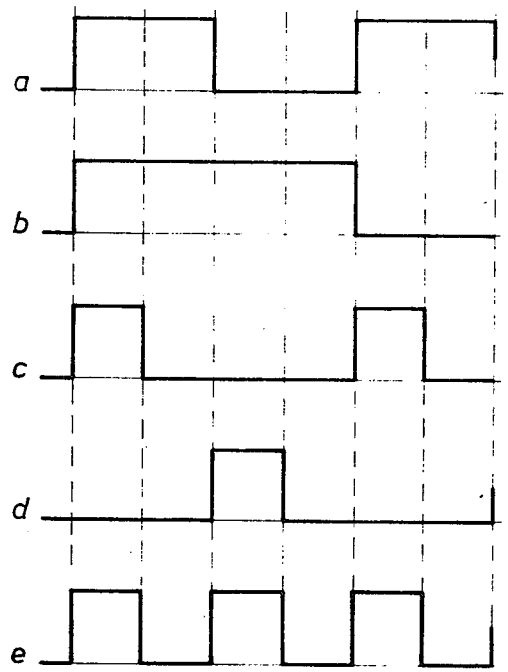
FIG. 7 shows the signal sequences at the input and output of the flip circuits of FIGS. 5 and 6.

The outputs of switching stages 5 through 8 are connected likewise to the inputs of signal generators or flip circuits 11 through 14 respectively and 15 through 18 respectively. As shown in FIG. 5, each of the flip circuits 11 through 14 comprises a bistable flip stage 31 having a dynamic input 32 which causes the bistable flip state 31 to be flipped at every O/L change of its input signal $a$ (see FIG. 7) and thus produces an output signal $b$ at a frequency $f/2$ from the signal $a$ at a frequency $f$.

The outputs of the flip circuits 11 through 14 are connected to an adder 19 which is connected in series with a bandpass filter 20 which has a center frequency $f/2$ and whose output signal is a group signal G1. The group signal G1 indicates a directional characteristic as shown in FIG. 2 which has a main lobe twice as wide as the main lobe of echo signal E and whose side lobes are greatly attenuated.

Figure 6:
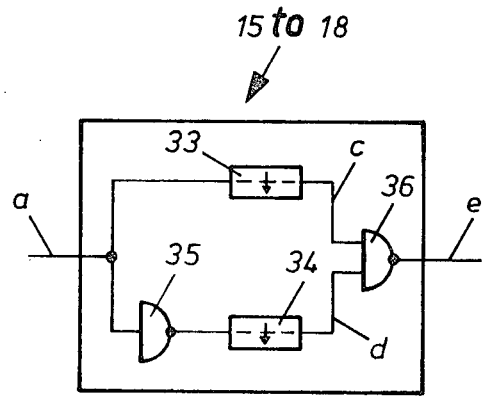
FIG. 6 shows a flip circuit for forming output signals with the frequency $2f$ according to the block circuit diagram of FIG. 1.

As shown in FIG. 6, each of the flip circuits 15 to 18 includes two monostable multivibrator stages 33 and 34 which are essentially connected in parallel but with multivibrator 34 having an inverter 35 connected ahead of it. The outputs of the two monostable multivibrators 33 and 34 are connected to a NAND gate 36 whose output is the output of the respective one of the flip circuits 15 through 18.

The monostable multivibrator 33 is triggered at every O/L change of the input signal $a$, while monostable multivibrator 34 is triggered, due to the presence of the series-connected inverter 35, at every L O change of the input signal $a$. The two monostable multivibrators 33 and 34 are designed so that they flip back after a time which is precisely half the duration of a rectangular pulse of input signal $a$. Thus they form signals $c$ and $d$ (FIG. 7) which are fed to NAND gate 36 which then permits a pulse sequence $e$ (FIG. 7) with the frequency $2f$ to pass.

Figure 3:
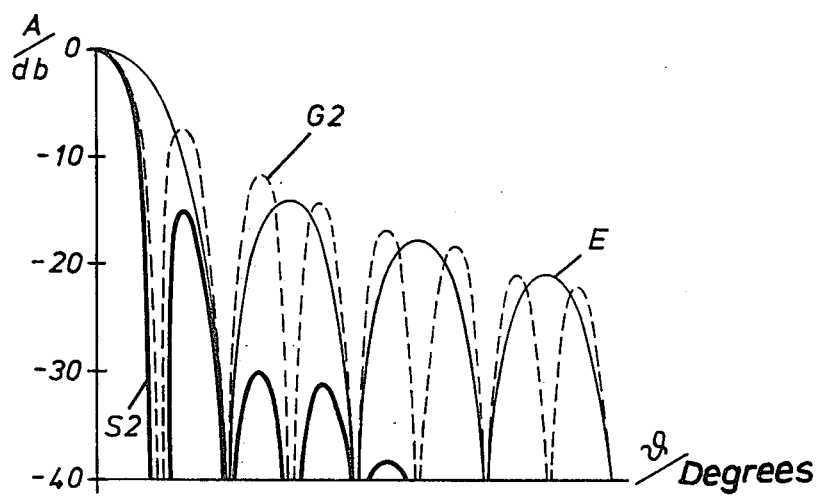
FIG. 3 shows the directional characteristics of an echo signal, a group signal with a frequency which is twice the frequency of the echo signal, as well as the product resulting from the multiplication of both these signals.

The outputs of flip circuits 15 through 18 are all connected to an adder 21 which is connected in series with a bandpass filter 22 which has a center frequency $2f$ and whose output signal is a group signal G2, as shown in FIG. 3, indicates a directional characteristic with a narrow main lobe and very high side lobes.

The echo signal E is connected, via a rectifier 25, to one input of a multiplier 26 whose other input receives the group signal G1. The output signal S1 of multiplier 26 produces, in a graph in which the amplitude of 0 dB is standardized to 1, a directional characteristic with greatly attenuated side lobes (see FIG. 2).

The group signal G2 is connected via a rectifier 27, to an input of a second multiplier 28, and the echo signal E is connected to the other input of multiplier 28. The output signal S2 of multiplier 28 produces a directional characteristic with narrow main lobe and attenuated side lobes (see FIG. 3).

Figure 4:
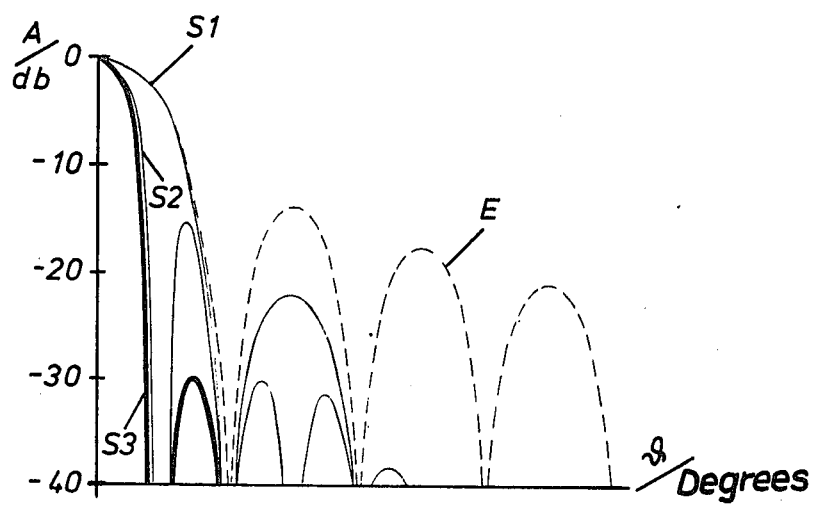
FIG. 4 shows the directional characteristic of the producst of FIGS. 2 and 3 as well as the product resulting from the multiplication of the two products.

Finally, in order to produce the improved directional characteristic according to the invention, the output of multiplier 28 is connected, via a rectifier 30, to one input of a third multiplier 29 to whose other input is connected the output of multiplier 26. The multiplier 29 multiplies the signals S2 and S1, and produces an output signal S3 which as shown in FIG. 4 produces a directional characteristic with a narrow main lobe and very heavily attenuated side lobes.

It will be understood that the above description of the present invention is susceptible to various modifications, changes and adaptations, and the same are intended to be comprehended within the meaning and range of equivalents of the appended claims.

What is claimed is:

1. A method for improving the directional characteristic of an echo sounder receiving base, comprising a plurality of transducers arranged in a plane, by way of multiplicative processing of output signals obtained from the signals received by the transducers when utilizing a submarine sound wave generator with a constant transmitting frequency, said method comprising the steps of: deriving a plurality of output signals of different frequencies from each signal received by each transducer with the same frequency as the transmitting frequency, with one of said different frequencies being said transmitting frequency, another of said different frequencies being a higher frequency than said transmitting frequency and a further of said different frequencies being a lower frequency than said transmitting frequency; adding all of the output signals of the same frequency as said transmitting frequency to form a first group signal; adding all of said signals of said higher frequency to form a second group signal and all of said signals of said lower frequency to form a third group signal; multiplying said first and second group signals to provide a first product; multiplying said first and third group signals to form a second product; and multiplying said first and second products to provide a third product which is the desired directional characteristic.

2. A method as defined in claim 1 wherein said step of deriving includes converting the signals received by the transducers to rectangular pulse sequences with the same frequency as the transmitting frequency and with a constant amplitude; and providing all of the other said output signals in the form of rectangular pulse sequences of the desired frequency with constant amplitude; and further comprising filtering out the undersirable frequency components from each of said group signals prior to said multiplying steps.

3. A method as defined in claim 1 wherein said higher frequency is equal to twice said transmitting frequency and said lower frequency is equal to one half of said transmitting frequency.

4. In combination with an echo sounder receiving base comprising a plurality of transducers arranged in a common plane, a circuit arrangement for improving the directional characteristic of said base from the signals received by said transducers from an underwater sound wave generator with a constant transmitting frequency; said circuit arrangement comprising in combination: a plurality of switching stage means, each connected to the output of a respective one of said transducers for converting the respective signals of said transmitting frequency received by said transducers to constant amplitude rectangular wave pulse sequences of said transmitting frequency; a first adder connected to the outputs of said switching stage means; a first bandpass filter connected to the output of said first adder, said first bandpass filter having a center frequency equal to said transmitting frequency; a first plurality of signal generator means, each having its input connected to the output of a respective one of said switching stage means, for providing a like plurality of output signals at one-half of said transmitting frequency; a second adder connected to the outputs of said first plurality of signal generator means; a second bandpass filter connected to the output of said second adder, said second bandpass filter having a center frequency equal to one-half of said transmitting frequency; a second plurality of signal generator means, each having its input connected to the output of a respective one of said switching stage means, for providing a like plurality of output signals at twice the frequency of said transmitting frequency; a third adder connected to the outputs of said second plurality of signal generator means; a third bandpass filter connected to the output of said third adder, said third bandpass filter having a center frequency equal to twice said transmitting frequency; first, second and third multipliers, each having two inputs and an output, said first multiplier having its two inputs connected to the respective outputs of said first and second bandpass filters, said second multiplier having its two inputs connected to the respective outputs of said first and third bandpass filters, and said third multiplier having its two inputs connected to the respective outputs of said first and second multipliers, the output of said third multiplier constituting the output of said circuit arrangement.

5. A circuit arrangement as defined in claim 4 wherein each of said switching stage means has an infinitely low switching threshold.

6. A circuit arrangement as defined in claim 4 wherein each of said first plurality of generator means is a bistable flip stage with a dynamic input.

7. A circuit arrangement as defined in claim 4 wherein each of said second plurality of signal generator means comprises: first and second monostable miltivibrators, an input terminal connected to the input of said first multivibrator, an inverter connected between said input terminal and the input of said second multivibrator; and a NAND gate having its two inputs connected to the respective outputs of said first and second multivibrators and whose output is the output of the respective signal generator means.

* * * * *